(12) United States Patent
Höglund et al.

(10) Patent No.: US 11,723,065 B2
(45) Date of Patent: *Aug. 8, 2023

(54) METHODS AND NODES FOR DECODING OF CONTENTION BASED UPLINK TRANSMISSIONS

(71) Applicant: Telefonaktiebolaget LM Ericsson (publ), Stockholm (SE)

(72) Inventors: Andreas Höglund, Solna (SE); Osman Nuri Can Yilmaz, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 37 days.

This patent is subject to a terminal disclaimer.

(21) Appl. No.: 17/386,112

(22) Filed: Jul. 27, 2021

(65) Prior Publication Data

US 2022/0046700 A1 Feb. 10, 2022

Related U.S. Application Data

(63) Continuation of application No. 16/520,415, filed on Jul. 24, 2019, now Pat. No. 11,109,407, which is a
(Continued)

(51) Int. Cl.
*H04W 72/00* (2023.01)
*H04W 74/08* (2009.01)
(Continued)

(52) U.S. Cl.
CPC ........... *H04W 74/08* (2013.01); *H04W 60/04* (2013.01); *H04W 72/21* (2023.01)

(58) Field of Classification Search
CPC . H04W 74/08; H04W 60/04; H04W 72/0413; H04W 60/00; H04W 74/002; Y02D 30/70
See application file for complete search history.

(56) References Cited

U.S. PATENT DOCUMENTS

2008/0080472 A1 4/2008 Bertrand et al.
2009/0154607 A1 6/2009 Lindoff et al.
(Continued)

FOREIGN PATENT DOCUMENTS

CN 102474864 A 5/2012
CN 102474886 A 5/2012
(Continued)

*Primary Examiner* — Lakeram Jangbahadur
(74) *Attorney, Agent, or Firm* — Murphy, Bilak & Homiller, PLLC

(57) ABSTRACT

A network node, a wireless device and methods therein, for decoding of contention based uplink transmissions of data in a cell served by the network node. The network node registers the wireless device for contention based uplink transmissions of data on a radio resource reserved for contention based uplink transmissions of data, e.g. when receiving a registration request sent from the wireless device, such that the wireless device is included in a set of wireless devices being registered for contention based uplink transmissions of data on the radio resource in the cell. The network node then performs blind decoding of uplink signals transmitted on the radio resource by considering the wireless devices in the set. In this way, the decoding is made more efficient by disregarding any other wireless devices in the cell which are not registered for contention based uplink transmissions of data on the radio resource in the cell.

13 Claims, 5 Drawing Sheets

Related U.S. Application Data continuation of application No. 15/506,617, filed as application No. PCT/SE2014/050983 on Aug. 27, 2014, now Pat. No. 10,412,762.

(51) Int. Cl.
*H04W 72/21* (2023.01)
*H04W 60/04* (2009.01)

(56) References Cited

U.S. PATENT DOCUMENTS

| | | | |
|---|---|---|---|
| 2011/0039568 A1* | 2/2011 | Zhang | H04W 72/14 455/452.1 |
| 2011/0051668 A1 | 3/2011 | Lee et al. | |
| 2011/0086619 A1* | 4/2011 | George | H04M 1/72415 455/414.1 |
| 2011/0176500 A1 | 7/2011 | Wager et al. | |
| 2011/0292895 A1 | 12/2011 | Wager et al. | |
| 2012/0236816 A1 | 9/2012 | Park et al. | |
| 2013/0102320 A1 | 4/2013 | Suzuki et al. | |
| 2014/0192767 A1 | 7/2014 | Au et al. | |
| 2014/0254544 A1* | 9/2014 | Kar Kin Au | H04L 1/1812 370/329 |
| 2018/0249491 A1 | 8/2018 | Au et al. | |

FOREIGN PATENT DOCUMENTS

| | | |
|---|---|---|
| CN | 102714872 A | 10/2012 |
| CN | 102948247 A | 2/2013 |
| EP | 2367394 A1 | 9/2011 |
| JP | 2011041161 A | 2/2011 |
| JP | 2013502163 A | 1/2013 |
| RU | 2491723 C2 | 8/2013 |
| WO | 2010057540 A1 | 5/2010 |
| WO | 2014069788 A1 | 5/2014 |

* cited by examiner

METHODS AND NODES FOR DECODING OF CONTENTION BASED UPLINK TRANSMISSIONS

RELATED APPLICATIONS

This application is a continuation of U.S. application Ser. No. 16/520,415 filed 24 Jul. 2019, which is a continuation of U.S. application Ser. No. 15/506,617 filed 24 Feb. 2017, now U.S. Pat. No. 10,412,762, which is a U.S. National Phase Application of PCT/SE2014/050983 filed 27 Aug. 2014. The entire contents of each aforementioned applications is incorporated herein for reference.

TECHNICAL FIELD

The present disclosure relates generally to a network node of a radio network, a wireless device and methods therein, for decoding of contention based uplink transmissions of data in a cell served by the network node.

BACKGROUND

In the field of mobile or wireless communication, the term "wireless device" or just "device" for short, is often used and will be used in this disclosure to represent any wireless communication entity capable of radio communication with a radio network by sending and receiving radio signals, such as e.g. mobile telephones, tablets and laptop computers. Another common term in this field is "User Equipment, UE". A wireless device in this context could also be a machine-to-machine type of device operating automatically such as a sensor, counter or measuring entity which is configured to send reports over the radio network e.g. at certain intervals or upon certain events.

Further, the term "network node", sometimes also referred to as a base station, radio node, e-NodeB, eNB, NB base transceiver station, access point, etc., is used here to represent any node of a radio network that is arranged to communicate radio signals with wireless devices. The network node described here may, without limitation, be a so-called macro base station or a low power base station such as a micro, pico, femto, Wifi or relay node, to mention some customary examples. Throughout this disclosure, the terms "base station" and "UE" could alternatively be used instead of network node and wireless device, respectively.

In a typical radio network for wireless communication, a multitude of different wireless devices are frequently communicating by transmitting data over uplink data channels to network nodes serving different cells in the radio network. The normal procedure is that a wireless device intending to transmit data must first transmit a scheduling request to its serving network node and then await an uplink grant from the network node which specifies a radio resource, e.g. in terms of subframes on a certain frequency and/or channel, being reserved for the data transmission. This procedure is sometimes referred to as access reservation.

However, since it has become more and more common that many wireless devices frequently need to transmit only quite small amounts of data at irregular and unpredictable intervals, the above-described access reservation procedure with request and grant before each data transmission becomes a burden and creates a great "overhead" of signaling and delays for both the wireless device and the network node to handle. The access reservation procedure thus requires substantial amounts of control signaling and processing for communicating relatively small amounts of data, and also causes latency in the data communication. Another drawback is that power consumption is high in the wireless device. As a result, it has been suggested in the Third Generation Partnership project, 3GPP, that contention-based uplink transmission can be employed instead of the above-described access reservation for such data transmissions. Some examples of how contention-based uplink transmissions can be employed are described in WO 2010057540 A1.

Contention-based uplink transmission means that any wireless device can transmit data to a serving network node on a common radio resource at the risk of collision when two or more devices happen to transmit simultaneously. This works well as long as there are only a limited number of wireless devices in the cell and collisions occur rarely. Some network nodes are equipped with advanced receivers capable of so-called Multi-User Detection, MUD, so that transmissions received from more than one wireless device at the same time can be decoded.

The network node receiving such a contention-based uplink transmission is able to determine the transmitting device and decode the transmitted data by performing so-called "blind decoding" based on some identifier of each potential transmitting device. This means that the network node must attempt to decode the received transmission based on one identifier at the time, thus performing blind decoding across all devices in the cell by going through the identifiers, one by one, of all wireless devices that may potentially have transmitted the received data. Examples of how blind decoding of a received transmission can be performed are described in US 20090154607 A1.

It is however a problem that when a network node is serving a great number of wireless devices, it will need to perform blind decoding across all of these wireless devices in order to decode a received contention-based uplink transmission. FIG. 1 illustrates a communication scenario where the feature of contention-based uplink transmission is employed e.g. on a specific radio resource or channel reserved for such transmissions. This figure shows that multiple wireless devices D1-D6 are being served by a network node 100 in a cell 102. In reality, there may be a much larger number of devices being served by the same network node and this figure only illustrates this schematically. According to conventional procedures, the network node 100 performs blind decoding across all of these wireless devices D1-D6 in order to identify and decode a received contention-based uplink transmission, which is therefore a quite complex and processing-heavy operation when the number of devices is large. The risk for failed decoding also increases with the number of potential wireless devices present in the cell such that the transmitting device have to try again by re-transmitting its data.

If the devices D1-D6 also can use different transmission formats, or Modulation and Coding Schemes, MCSs, each potential wireless device needs to be tested by the network node 100 for all possible transmission formats or MCSs, thereby requiring the network node to perform the blind decoding not only across a large number of devices but also over all possible transmission formats, resulting in a huge number of possible hypotheses for each received transmission.

SUMMARY

It is an object of embodiments described herein to address at least some of the problems and issues outlined above. It is possible to achieve this object and others by using a method and a network node as defined in the attached independent claims.

According to one aspect, a method is performed by a network node of a radio network, for decoding of contention based uplink transmissions of data in a cell served by the network node. In this method, the network node registers a wireless device for contention based uplink transmissions of data on a radio resource reserved for contention based uplink transmissions of data. The network node then performs blind decoding of contention based uplink transmissions on the radio resource by considering wireless devices being registered for contention based uplink transmissions of data on the radio resource in the cell.

According to another aspect, a network node of a radio network is arranged for decoding of contention based uplink transmissions of data in a cell served by the network node, The network node comprises means configured to register a wireless device for contention based uplink transmissions of data on a radio resource reserved for contention based uplink transmissions of data. The network node also comprises means configured to perform blind decoding of contention based uplink transmissions on the radio resource by considering wireless devices being registered for contention based uplink transmissions of data on the radio resource in the cell.

According to another aspect, a method is performed by a wireless device for enabling a network node of a radio network to decode contention based uplink transmissions of data in a cell served by the network node. In this method, the wireless device sends a registration request to the network node for contention based uplink transmissions of data on a radio resource reserved for contention based uplink transmissions of data. The wireless device then receives an acknowledgement from the work node indicating that the wireless device is registered for contention based uplink transmissions of data in the cell. The wireless device further transmits data on the radio resource, thereby enabling the network node to perform blind decoding of the data by considering wireless devices being registered for contention based uplink transmissions of data on the radio resource in the cell.

According to another aspect, a wireless device is arranged to enable a network node of a radio network to decode contention based uplink transmissions of data in a cell served by the network node. The wireless device comprises means configured to send a registration request to the network node for contention based uplink transmissions of data on a radio resource reserved for contention based uplink transmissions of data. The wireless device also comprises means configured to receive an acknowledgement from the network node indicating that the wireless device is registered for contention based uplink transmissions of data in the cell. The wireless device further comprises means configured to transmit data on the radio resource, thereby enabling the network node to perform blind decoding of the data by considering wireless devices being registered for contention based uplink transmissions of data on the radio resource in the cell.

The above network node, wireless device and methods therein may be implemented and configured according to different optional embodiments to accomplish further features and benefits, to be described below.

A computer program is also provided comprising instructions which, when executed on at least one processor, cause the at least one processor to carry out either of the above methods. A carrier is also provided which contains the above computer program, wherein the carrier is one of an electronic signal, optical signal, radio signal, or a non-tangible computer readable storage medium.

BRIEF DESCRIPTION OF THE DRAWINGS

The solution will now be described in more detail by means of exemplary embodiments and with reference to the accompanying drawings, in which.

DETAILED DESCRIPTION

Briefly described, a solution is provided to facilitate the process in a network node of decoding contention based uplink transmissions of data in a cell served by the network node. As explained above, in conventional procedures the network node needs to perform blind decoding across a great number of wireless devices, and perhaps also over different possible MCSs, when receiving such contention based uplink transmissions. In this solution however, the network node is able to perform blind decoding of uplink signals transmitted on the radio resource by considering only a reduced number of wireless devices that are registered for contention based uplink transmissions of data on the radio resource in the cell. This means that the network node can disregard any other wireless devices in the cell which are not registered in this way, when performing the blind decoding, and the number of devices to consider in this operation can thereby be substantially reduced.

Furthermore, the wireless devices may also have been registered with preferences regarding communication parameters, which may refer to, e.g., uplink and downlink channels, MCS, Hybrid automatic repeat request (HARQ), timing advance, power control, header compression, etc. In that case, the network node may be aware of which MCS will be used by the registered wireless devices when transmitting and can thus limit the blind decoding to the possible MCS(s) according to the preferences of the registered devices.

Figure 1:
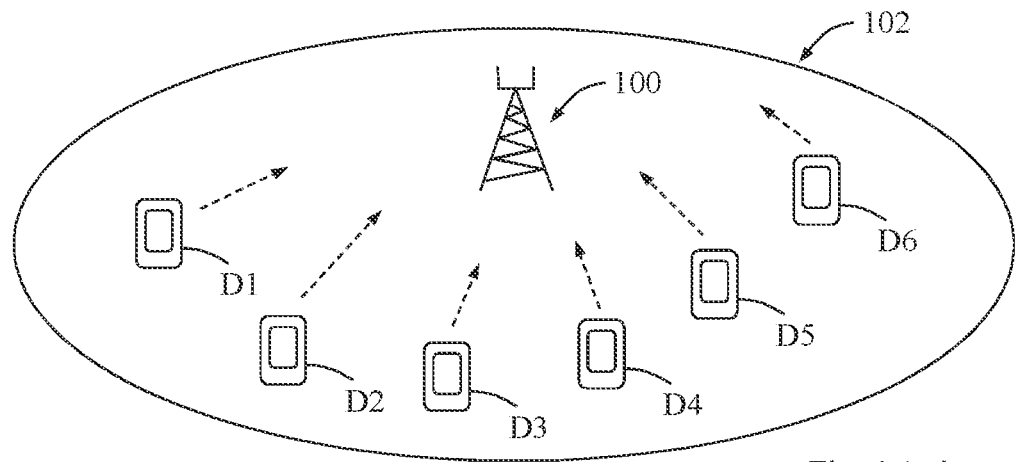
FIG. 1 is a communication scenario illustrating a network node receiving contention based uplink transmissions in a cell, according to the prior art.
Figure 2:
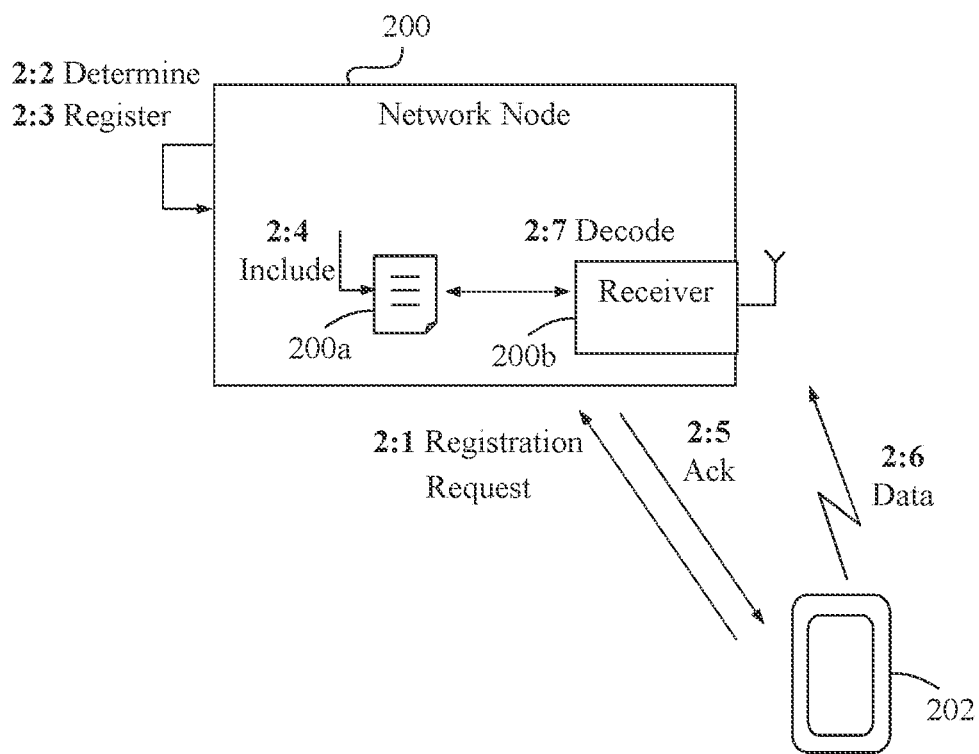
FIG. 2 is a block diagram illustrating a procedure for decoding of contention based uplink transmissions in a network node, according to some possible embodiments.

Some features of this procedure will now be outlined with reference to a communication scenario illustrated in FIG. 2, involving a network node 200 serving various wireless devices in a cell and a shown wireless device 202 being served by the network node 200. In this procedure, the wireless device 202 sends a registration request to the serving network node 200, for contention based uplink transmissions of data, as shown in an action 2:1.

For example, the wireless device 202 may have decided or detected that it will have data to transmit in quite small amounts but on several different occasions, and that this transmission pattern would benefit from contention based uplink transmissions of the data in order to avoid overhead signalling. An illustrative but non-limiting example of such a transmitting behaviour is when the wireless device is a sensor or the like configured to send measurement reports frequently, where each report contains a small amount of data but the reports are to be sent many times according to some scheme. In general, the wireless device 202 may have decided or detected, for whatever reason, that the overhead signalling associated with the conventional access reservation procedure requiring request and grant should be avoided.

When receiving the registration request, the network node 200 takes a decision whether to register the wireless device 202 or not, as shown in another action 2:2. This decision may be based on various factors which will be described in more detail later below. In this example, the network node 200 registers the wireless device 202, in another action 2:3, for contention based uplink transmissions of data on a specific radio resource which is reserved for contention based uplink transmissions of data. As an alternative to requiring a registration request from the wireless device 202, it may be registered automatically on a "higher level" for contention based transmissions, e.g. based on preferences or settings in a subscription or similar. In this case, the registration request of action 2:1 can be omitted thus further reducing the signalling overhead.

In either case, the network node 200 registers the device 202 by including it in a set of wireless devices being registered for contention based uplink transmissions of data on the radio resource in the cell, which is shown by another action 2:4. Action 2.4 can thus be regarded as being part of the registration action 2:3. This set of registered wireless devices 200a may be maintained as a list or the like in the network node 200. The list may contain at least a suitable identifier of each wireless device in the set 200 which may be used in the blind decoding operation, and optionally also preferences regarding communication parameters if any have been registered for the respective device.

In this example, the network node 200 further sends an acknowledgement to the wireless device 202, in an action 2:5, to indicate that it is registered and included in the set. Another action 2:6 illustrates that the wireless device 202 at some point transmits data on the radio resource reserved for contention based uplink transmissions of data, which the device is effectively allowed to do since it has been registered and added to the set of registered wireless devices in actions 2:3 and 2:4.

A final action 2:7 illustrates that the network node 200 performs blind decoding of uplink signals transmitted on the radio resource by considering the wireless devices in the set 200a, and thus disregarding any other wireless devices in the cell which are not in the set 200a. For example, the blind decoding may be performed by the network node in this action based on an identifier of each wireless device in the set. This identifier may further be a Cell Radio Network Temporary Identity, C-RNTI. The technique used for performing the actual operation of blind decoding may be conventional as such and is somewhat outside the scope of this solution. Anyway, since the wireless device 202 has been registered and included in the set, the network node is able to identify device 202 and decode its transmission by considering only the set 200a.

Advantages of this solution include a simplified and more reliable operation of blind decoding by limiting the number of possible devices to the above-described set 200a and possibly also to a reduced number of potential MCSs according to their preferences, if any. Another advantage is that the network node 200 can estimate the current need for contention based uplink transmissions of data in the cell based on the number of registered devices in the set, so that the network node 200 can configure and tune the radio resource reserved therefor accordingly in a flexible manner and on a dynamic basis.

An example of a procedure, performed by a network node of a radio network when the solution is employed, will now be described with reference to the flow chart in FIG. 3. In this procedure, the network node is operable for decoding of contention based uplink transmissions of data in a cell served by the network node, as follows. The procedure thus involves the network node and a wireless device which may be the above-described network node 200 and wireless device 202, respectively.

A first action 300 illustrates that the network node registers a wireless device for contention based uplink transmissions of data on a radio resource reserved for contention based uplink transmissions of data. This action may be made so that the wireless device is included in a set of wireless devices being registered for contention based uplink transmissions of data on the radio resource in the cell, as shown by another action 302 which thus may be seen as part of action 300. An optional action 304 illustrates that the network node may, according to a possible embodiment, send an acknowledgement to the wireless device indicating that the wireless device is registered for contention based uplink transmissions of data on the radio resource, and is thereby included in the set.

A final action 306 illustrates that the network node performs blind decoding of contention based uplink transmissions on the radio resource by considering wireless devices being registered for contention based uplink transmissions of data on the radio resource, i.e. the wireless devices in the set. This means that the network node can disregard any other non-registered wireless devices in the cell which are not in the set, when performing the blind decoding, which is an advantage as explained above. Thereby, the same advantages may be achieved as those described above for FIG. 2.

Some optional but non-limiting embodiments will now be described which may be used for the network node. In some possible embodiments, the network node may determine whether to register the wireless device or not based on at least one of:

The current load on the radio resource, i.e. referring to the amount of data currently being transmitted by registered wireless devices on the radio resource reserved for contention based uplink transmissions of data. For example, if the current load on the radio resource is close to or above a maximum limit, the network node may decide not to register the wireless device in order to avoid congestion on the radio resource that could result in collisions and failure of the blind decoding. It is also possible for the network node to remove one or more wireless devices from the set, e.g. if the blind decoding frequently fails due to many collisions or poor signal reception, to improve the blind decoding.

The current traffic load in the cell. For example, if the current traffic load in the cell is high and exceeds a certain level, the network node may decide not to register the wireless device.

Measurements of signals received from the wireless device, e.g. related to signal strength, signal quality, bit error rate, block error rate, etc. For example, the network node may decide to register the wireless device if the signal measurements indicate a sufficiently good reception of the signals while if the signal reception is poor, the network node may decide not to register the wireless device since transmissions from the wireless device will be difficult to decode.

The current number of registered wireless devices, thus being included in the set. For example, the network node may decide to register the wireless device only if the number of registered wireless devices remains below a maximum limit. The maximum number of registered devices in the set may be variable depending on, e.g., the current load on the radio resource and/or the current traffic load in the cell. For example, when the current load on the radio resource is relatively low, a larger number of registered devices in the set may be allowed than when the current load is relatively high.

A subscription setting valid for the wireless device. For example, the wireless device may have a subscription that allows the wireless device to be registered for contention based uplink transmissions of data on the radio resource, e.g. at all times or at certain times and/or under certain circumstances.

Preferences of the wireless device regarding communication parameters, e.g. related to uplink and downlink channels, a specific MCS, a specific HARQ process, a certain timing advance, power control, header compression, to mention some illustrative but non-limiting examples.

In another possible embodiment, the wireless device may be registered for a predefined duration at predefined time intervals, such that the registration is effectively more or less "periodic". Thereby, the network node may distribute or spread the transmission traffic by assigning different time intervals for different wireless devices, e.g. to reduce or avoid the risk of collisions. The predefined duration and predefined time intervals may in this embodiment further be selected and "tailored" depending on the device's needs. It is also possible to group two or more wireless devices together on the same predefined time intervals so that the load on the radio resource is distributed in time. In this case, certain "matching" devices may further be grouped according to their capabilities and/or needs on the same predefined time intervals, so that utilization of the radio resource increase or maximize.

In further possible embodiments, the network node may de-register and remove the wireless device from the set based on at least one of:

The radio resource is congested, e.g. meaning that the blind decoding of action 306 often fails due to many collisions as a result of too many transmissions on the radio resource.

Poor reception of signals transmitted from the wireless device. As mentioned above, the network node may remove a wireless device from the set, if the blind decoding tends to fail due to poor signal reception from that device.

A de-registration request has been received from the wireless device. For example, the wireless device may decide not to transmit any further data, e.g. when there is no more data to send or when detecting that the contention based transmissions are not working such that re-transmissions are frequently necessary.

A predefined inactivity duration when the wireless device has not transmitted any data has expired, which would indicate that the contention based transmissions are not needed anymore by the wireless device, at least not for some time. The wireless device is in that case free to send another registration request to the network node to become registered whenever the need for contention based transmissions of data arises again.

A predefined registration duration when the wireless device has been registered has expired. This means that the wireless device is registered in action 300 for a limited period of time, i.e. until the predefined registration duration has expired.

As mentioned above, the wireless device may be registered when the network node receives a registration request from the wireless device, which is another possible embodiment. In further possible embodiments, the registration request may be received by the network node in a Radio Resource Control, RRC, connection request or an RRC connection re-establishment request, which are well-known messages as such.

In other possible embodiments, the above-mentioned registration request may comprise preferences regarding communication parameters that the device intends or prefers to use. Some non-limiting examples of such preferences may relate to preferred uplink and downlink channels, a preferred MCS, a preferred HARQ process, a preferred timing advance, a preferred power control mechanism, a preferred header compression, and so forth. Thereby, the wireless device may be registered with its preferences such that the network node will be aware of how the device will perform its contention based transmissions of data, which can further facilitate the blind decoding operation. In particular, the network node can limit the decoding attempts to the one MCS given in the device's preferences.

In yet a possible embodiment, the network node may accept the preferences in the wireless device's registration request and keep them in the registration, or the network node may modify the received preferences in the registration, e.g. if they are deemed unpractical or cannot be accepted for whatever reason. The network node may further modify the received preferences in the registration after some time if some circumstances such as traffic load have changed, i.e. at any time while the device remains registered and present in the set of registered wireless devices.

In another possible embodiment, the network node may create different sets of registered wireless devices for contention based uplink transmissions of data on different radio resources, based on preferences of the wireless devices regarding communication parameters. Thereby, the network node is able to group different wireless devices together on different radio resources e.g. in order to optimize utilization of the radio resources. For example, a device that is likely to transmit according to a certain behavior may be assigned to use a radio resource together with another device that is likely to transmit according to a complementary or matching behavior. In another example, devices having the same or similar preferences regarding communication parameters may be assigned to use the same radio resource which would further facilitate the blind decoding operation in the network node.

In a further possible embodiment, the acknowledgement sent in action 304 may comprise a temporary identifier which is valid for contention based uplink transmissions of data at least in the cell served by the network, and the network node may thereby perform the blind decoding based on the temporary identifier.

In another possible embodiment, the network node may forward the wireless device's registration to at least one other network node to make the registration valid across multiple cells of the radio network. Thereby, the wireless device will not need to send a new registration request each time it moves to another one of the multiple cells and is handed over to another network node that has received the device's registration.

Figure 4:
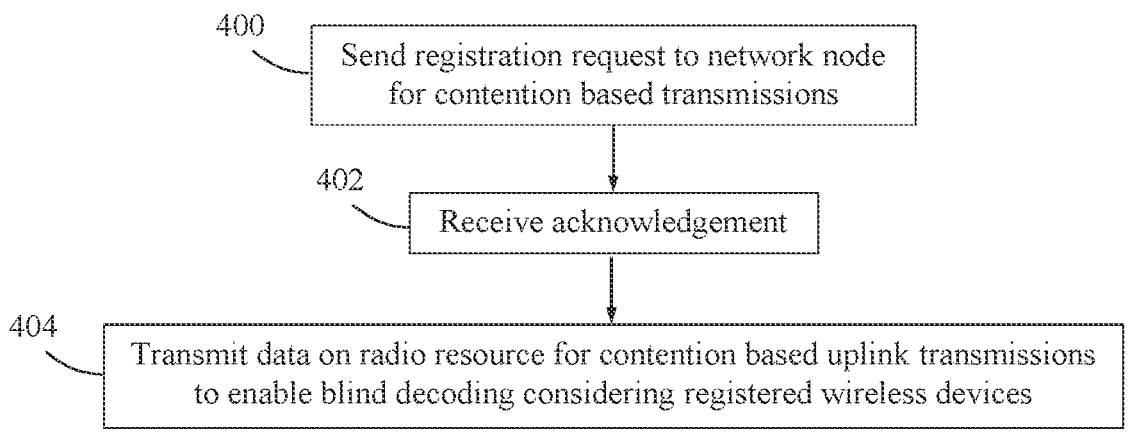
FIG. 4 is a flow chart illustrating a procedure in a wireless device, according to further possible embodiments.

A further example of a procedure, performed by a wireless device when the solution is employed, will now be described with reference to the flow chart in FIG. 4. In this procedure, the wireless device is operable to enable a network node of a radio network to decode contention based uplink transmissions of data in a cell served by the network node, as follows. In this procedure the wireless device may be the wireless device 202 described above, and the network node may be the network node 200 described above.

A first action 400 illustrates that the wireless device sends a registration request to the network node for contention based uplink transmissions of data on a radio resource reserved for contention based uplink transmissions of data. In another action 402, the wireless device receives an acknowledgement from the network node indicating that the wireless device is registered for contention based uplink transmissions of data on the radio resource in the cell. The wireless device may thus have been included in a set of wireless devices being registered for contention based uplink transmissions of data in the cell. Action 402 thus corresponds to action 304 in the previous example of FIG. 3 and it is assumed that the network node has performed the above-described actions 300 and 302 in response to receiving the registration request.

In a final shown action 404, the wireless device transmits data on the radio resource, thereby enabling the network node to perform blind decoding of the data by considering the wireless devices in the set in the manner described for action 306. Also in this procedure, the same advantages may be achieved as those described above for FIG. 2 and the network node may employ any of the embodiments described for FIG. 3.

Some optional but non-limiting embodiments may also be used for the wireless device which will now be described. In some possible embodiments, the wireless device may send the registration request in a Radio Resource Control, RRC, connection request or an RRC connection re-establishment request. In another possible embodiment, the wireless device may refrain from transmitting data on the radio resource in case a de-registration message is received from the network node indicating that the wireless device is removed from the set. Such a de-registration message has been described above for FIG. 3. In another possible embodiment, the wireless device may send a de-registration request to the network node, when deciding not to transmit any further data, e.g. if there is no more data to transmit or if the contention based transmissions do not work properly which may force the device frequently to perform re-transmissions of the same data.

A more detailed example of how a network node may act when performing the procedure of FIG. 3, will now be described with reference to the flow chart in FIG. 5. A first action 500 illustrates that the network node receives a registration request from the wireless device, for contention based uplink transmissions on a radio resource. Such a registration request has been described above. In a following action 502, the network node decides whether to admit the request and register the wireless device by including it in a set of registered devices, or not. Several examples of how such a decision can be made by the network node have been described above for FIG. 3 which is therefore not repeated here.

The network node may thus decide to refuse the device's request, as of action 504, e.g. because the radio resource is currently congested, the number of already registered wireless devices has reached a maximum limit, the signal reception is too poor, and so forth. At some point, the wireless device may send another registration request to the network node and the process may then return to action 500, as indicated by a dashed arrow.

If however the network node decides in action 502 to admit the device's request, the wireless device is included in a set of wireless devices being registered for contention based uplink transmissions of data on the radio resource in the cell, in another action 506. The network node also sends an acknowledgement to the wireless device, in an action 508, to indicate that that the wireless device is now registered for contention based uplink transmissions of data on the radio resource in the cell and is thus included in the set. Thereby, the wireless device is allowed to transmit data on the radio resource, e.g. according to certain restrictions in the registration such as during a predefined duration at predefined time intervals.

A next action 510 in this procedure indicates schematically that the network node may consider whether to de-register the wireless device or keep the registration. If the wireless device is not de-registered, the network node performs blind decoding of uplink signals transmitted on the radio resource, in an action 512, by considering the wireless devices in the set, which in this case includes the above-mentioned wireless device. Actions 510 and 512 may be repeated as indicated by another dashed arrow.

At some point, the network node may decide in action 510 to de-register the wireless device, e.g. because the radio resource has become congested, poor signal reception, the wireless device has sent a de-registration request, the wireless device has been inactive more than a certain maximum inactivity duration, or the wireless device has remained registered more than a certain maximum registration duration. If any of this occurs, the network node de-registers and removes the wireless device from the set, in an action 514. The network node also sends a de-registration message to the wireless device in action 516, to indicate that that the wireless device is no longer registered and has been removed from the set. A final action 518 illustrates that the network node performs blind decoding of contention based uplink transmissions on the radio resource, based on the updated set which now excludes the above-mentioned wireless device. The process may then return to action 500, as indicated by another dashed arrow, in case the wireless device sends another registration request to the network node.

Figure 6:
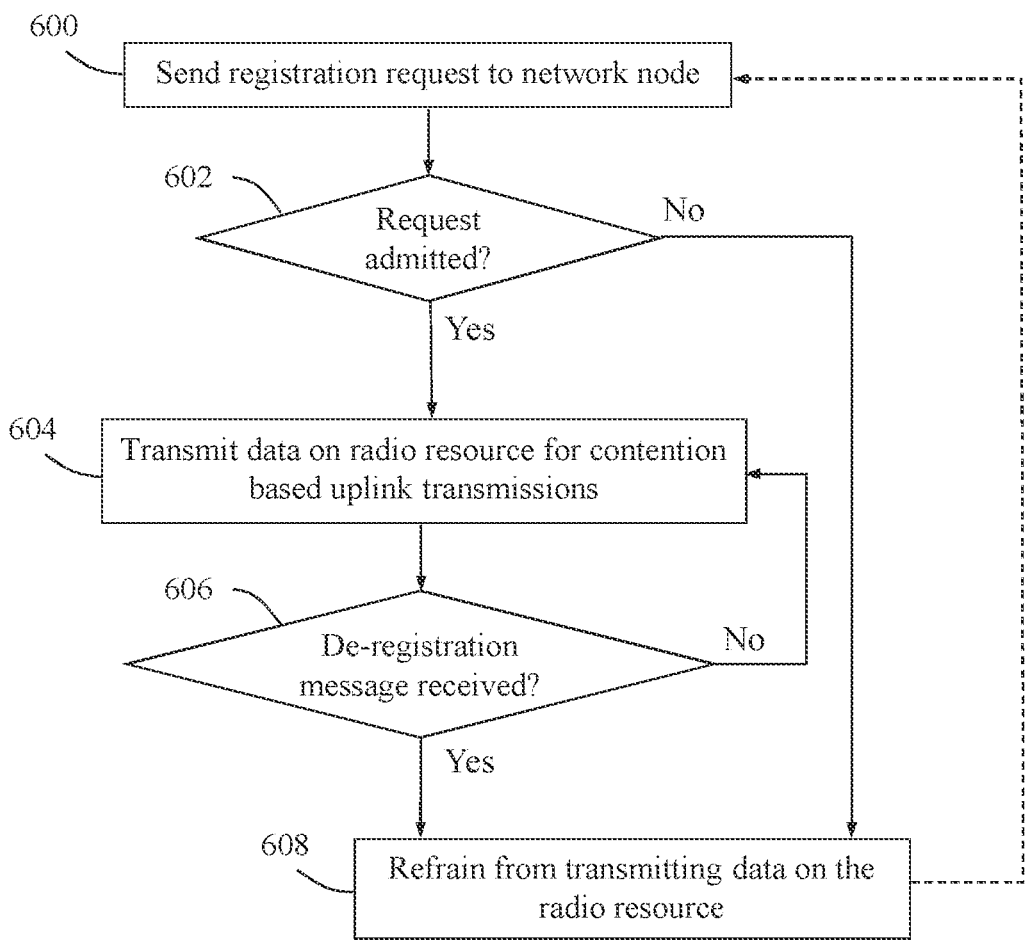
FIG. 6 is another flow chart illustrating a more detailed example of a procedure in a wireless device, according to further possible embodiments.

A more detailed example of how a wireless device may act when performing the procedure of FIG. 4, will now be described with reference to the flow chart in FIG. 6. A first action 600 illustrates that the wireless device sends a registration request to the network node. The wireless device then determines or detects in an action 602 whether the registration request has been admitted or not by the network node. If admitted, e.g. as indicated by an acknowledgement from the network node, the wireless device has been included in a set of wireless devices being registered for contention based uplink transmissions of data on the radio resource in the cell, and the wireless device at some point transmits data on the radio resource, as shown by an action 604. Thereby, the network node is able to perform blind decoding of the data by considering the wireless devices in the set which thus includes the above wireless device.

Another action 606 illustrates that the wireless device determines or detects whether a de-registration message has been received from the network node or not. If not, the wireless device may return to action 604 of transmitting data on the radio resource. If however a de-registration message has been received from the network node in action 606, this message indicates that the wireless device has been removed from the set and the wireless device accordingly refrains from transmitting data on the radio resource, as shown by an action 608. The process may then return to action 600, as indicated by a dashed arrow, in case the wireless device sends another registration request to the network node.

Figure 7:
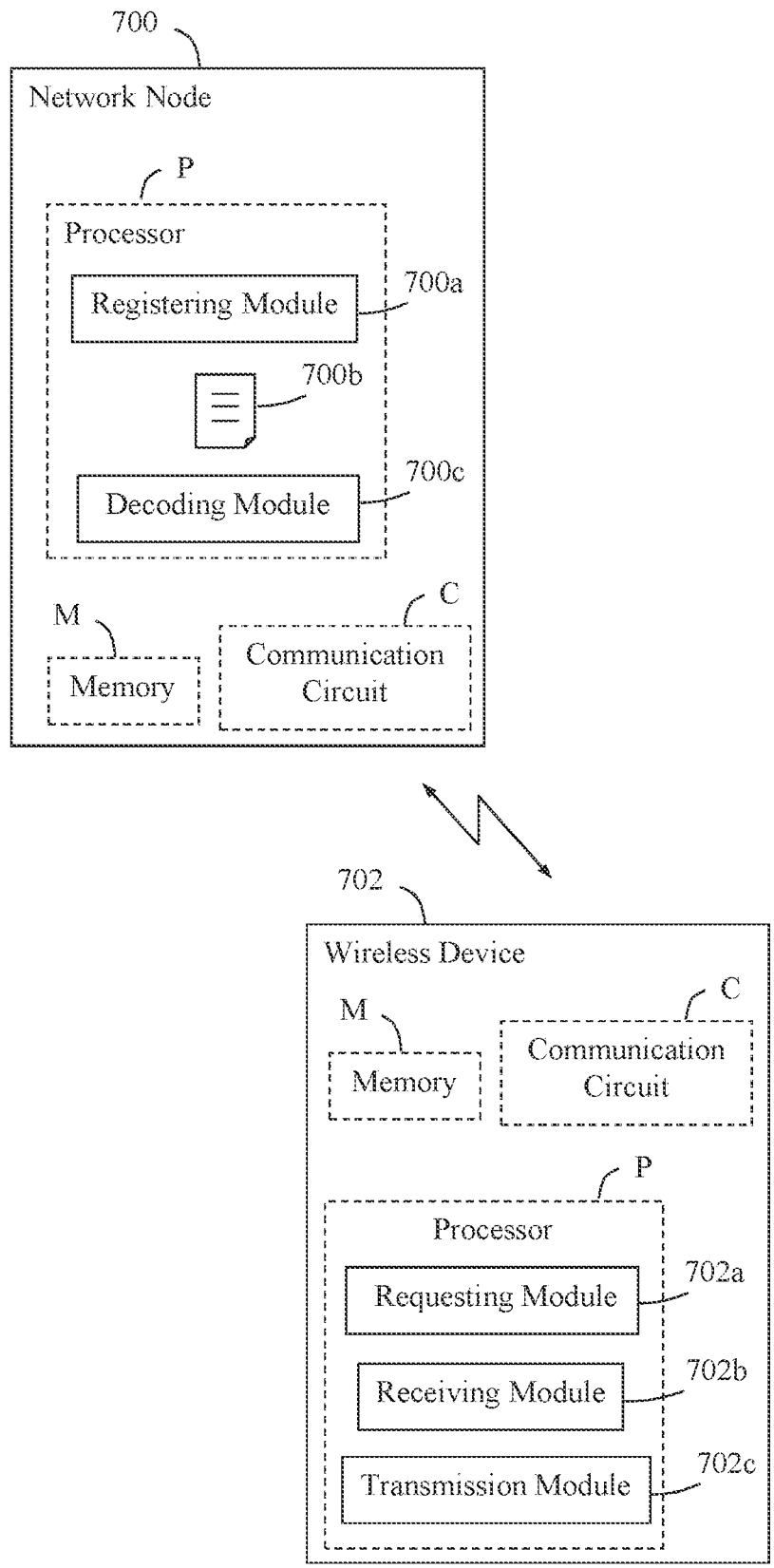
FIG. 7 is a block diagram illustrating a network node and a wireless device in more detail, according to further possible embodiments.

The block diagram in FIG. 7 illustrates a detailed but non-limiting example of how a network node 700 and a wireless device 702, respectively, may be structured to bring about the above-described solution and embodiments thereof. In this figure, the network node 700 and the wireless device 702 may be configured to operate according to any of the examples and embodiments of employing the solution as described above, where appropriate, and as follows. Each of the first network node 700 and the wireless device 702 is shown to comprise a processor "P", a memory "M" and a communication circuit "C" with suitable equipment for transmitting and receiving signals with information in the manner described herein.

The communication circuit C in each of the network node 700 and the wireless device 702 thus comprises equipment configured for communication with each other over a radio interface using a suitable protocol for radio communication depending on the implementation.

Figure 3:
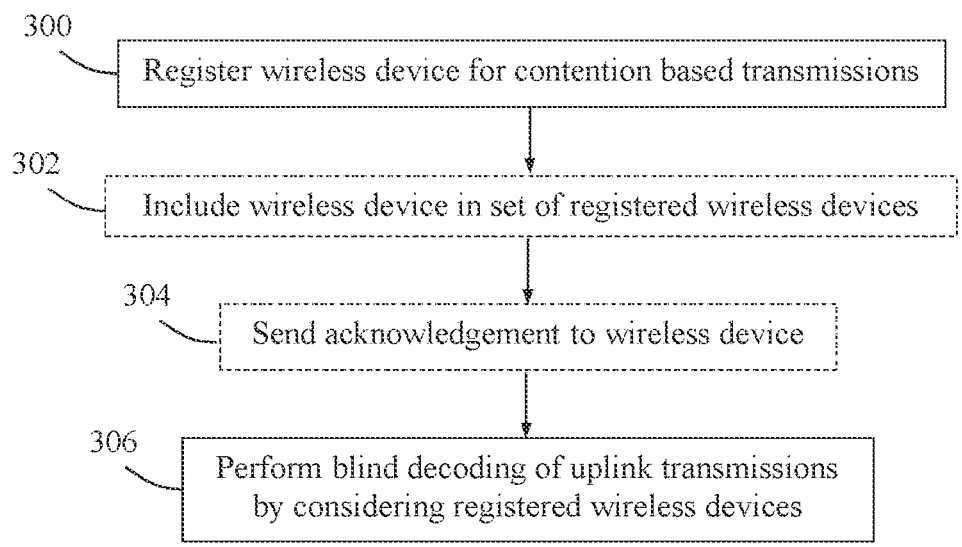
FIG. 3 is a flow chart illustrating a procedure in a network node, according to further possible embodiments.
Figure 5:
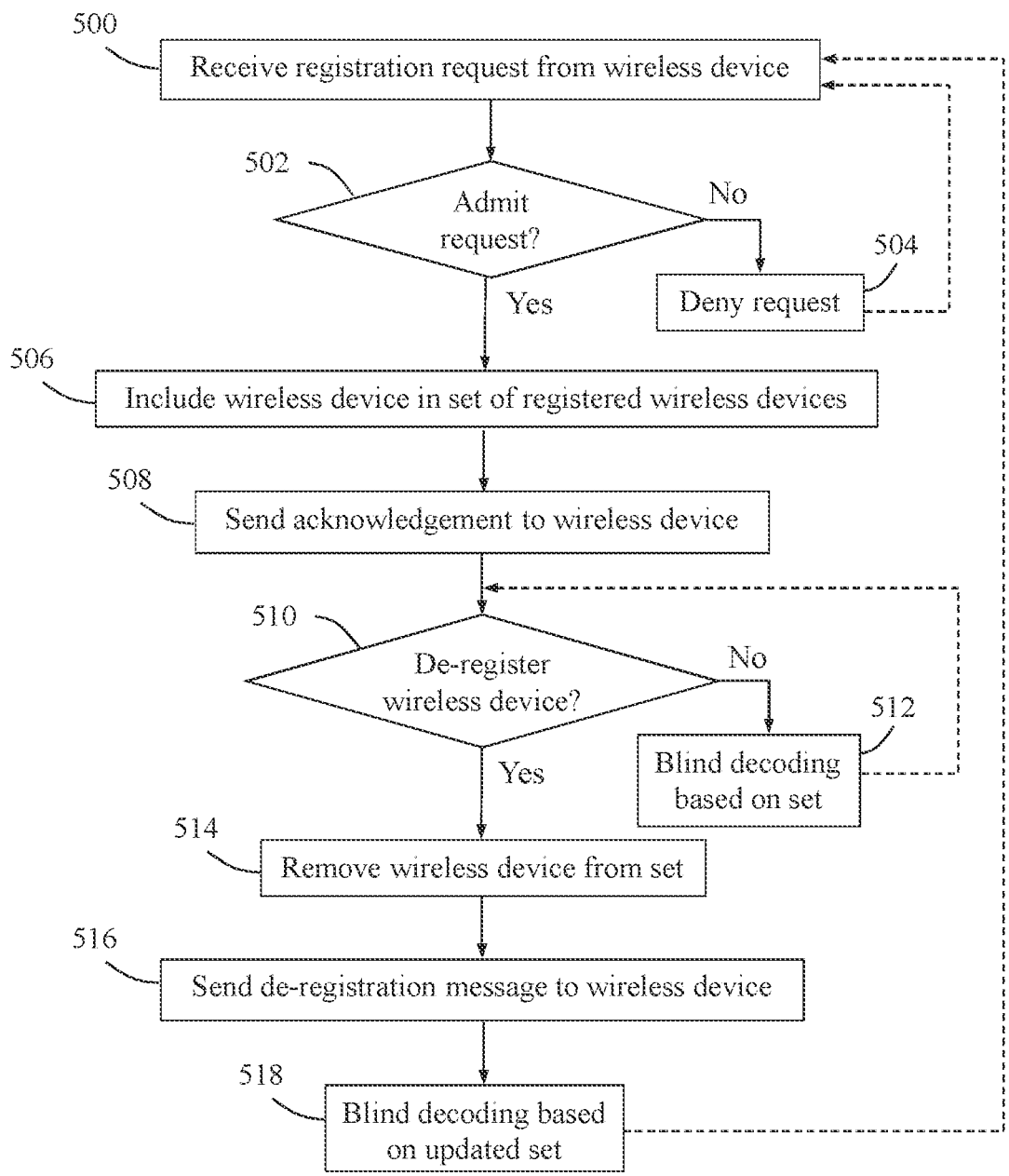
FIG. 5 is another flow chart illustrating a more detailed example of a procedure in a network node, according to further possible embodiments.

The network node 700 comprises means configured or arranged to perform at least some of the actions 300-306 and 500-518 of the flow charts in FIGS. 3 and 5, respectively, in the manner described above. Further, the wireless device 702 comprises means configured or arranged to perform at least some of the actions 400-404 and 600-608 of the flow charts in FIGS. 4 and 6, respectively, in the manner described above. These actions may be performed by means of functional modules in the respective processor P in the network node 700 and the wireless device 702 as follows.

The network node 700 is arranged for decoding of contention based uplink transmissions of data in a cell served by the network node. The network node 700 comprises means configured to register a wireless device 702 for contention based uplink transmissions of data on a radio resource reserved for contention based uplink transmissions of data. This may be done so that the wireless device 702 is included in a set 700b of wireless devices being registered for contention based uplink transmissions of data on the radio resource in the cell. This registering activity may be performed by an registering module 700a in the network node 700, e.g. in the manner described for actions 300 and 302 above.

The network node 700 also comprises means configured to perform blind decoding of contention based uplink transmissions on the radio resource by considering wireless devices being registered for contention based uplink transmissions of data on the radio resource in the cell, i.e. the wireless devices in the set 700b. This decoding activity may be performed by a decoding module 700c in the network node 700, e.g. in the manner described for action 306 above.

The wireless device 702 is arranged to enable a network node 700 of a radio network to decode contention based uplink transmissions of data in a cell served by the network node 700. The wireless device 702 comprises means configured to send a registration request to the network node 700 for contention based uplink transmissions of data on a radio resource reserved for contention based uplink transmissions of data. This activity may be performed by a requesting module 702a in the wireless device 702, e.g. in the manner described for action 400 above.

The wireless device 702 also comprises means configured to receive an acknowledgement from the network node 700 indicating that the wireless device 702 is registered. This may be done so that the wireless device 702 is included in a set of wireless devices being registered for contention based uplink transmissions of data in the cell. This receiving activity may be performed by a receiving module 702b in the wireless device 702, e.g. in the manner described for action 402 above. The wireless device 702 further comprises means configured to transmit data on the radio resource, thereby enabling the network node 700 to perform blind decoding of the data by considering wireless devices being registered for contention based uplink transmissions of data on the radio resource in the cell, i.e. the wireless devices in the set. This transmitting activity may be performed by a transmission module 702c in the wireless device 702, e.g. in the manner described for action 404 above.

It should be noted that FIG. 7 illustrates various functional modules in the network node 700 and the wireless device 702, respectively, and the skilled person is able to implement these functional modules in practice using suitable software and hardware. Thus, the solution is generally not limited to the shown structures of the network node 700 and the wireless device 702, and the functional modules 700a,c and 702a-c therein may be configured to operate according to any of the features and embodiments described in this disclosure, where appropriate.

The functional modules 700a,c and 702a-c described above can be implemented in the network node 700 and in the wireless device 702, respectively, by means of program modules of a respective computer program comprising code means which, when run by the processor P causes the respective network node 700 and wireless device 702 to perform the above-described actions and procedures. Each processor P may comprise a single Central Processing Unit (CPU), or could comprise two or more processing units. For example, each processor may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the network node 700 and the wireless device 702 in the form of a memory having a computer readable medium and being connected to the processor P. The computer program product or memory M in each of the network node 700 and the wireless device 702 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective network node 700 and wireless device 702.

The solution described herein may be implemented in each of the network node 700 and the wireless device 702 by a computer program comprising instructions which, when executed on at least one processor, cause the at least one processor to carry out the actions according to any of the above embodiments, where appropriate. The solution may also be implemented at each of the network node 700 and the wireless device 702 in a carrier containing the above computer program, wherein the carrier is one of an electronic signal, optical signal, radio signal, or computer readable storage medium.

It was mentioned above that blind decoding may be performed by the network node based on an identifier of each wireless device in the set, such as a C-RNTI or some temporarily identifier assigned specifically for contention-based uplink transmissions of data on the radio resource reserved therefor. Further details of the embodiments will be described below.

The network node may maintain the set in a list of all wireless devices being registered for contention-based access. The solution considers a contention-based access scheme where wireless devices are in RRC Connected Mode and therefore each wireless device will correspond to a specific C-RNTI. In legacy uplink data transmissions on PUSCH, the receiver determines if it has correctly decoded the data by checking the CRC scrambled by the C-RNTI of the respective wireless devices. In that case the network node will only consider one C-RNTI, namely that of the wireless device that was scheduled on that resource.

In the case of contention-based/instant access for wireless devices in RRC Connected Mode, the network node would have no knowledge of what wireless device is sending and would have to consider all wireless devices in the cell, that is, the full C-RNTI space. With this solution, the network node would only need to consider the wireless devices being registered for contention-based data transmissions on the radio resource. These wireless devices, or rather their C-RNTIs, will be kept in a list at the network node and only this subset of the full C-RNTI space will be considered for decoding of the transmissions received on the radio resource. It should be noted that the above-described registration is not limited to the use of C-RNTI for connecting decoding success to the device identity, which is only an example relating to the decoding operation.

In a possible implementation, the network node is able to have full control of this list of registered devices by being able both to deny contention-based registration requests from UEs as well as removing wireless devices from the list by sending de-registration messages. Approving/denying a registration request or adding/removing a wireless device from the list may depend on signal reception, e.g. in terms of signal strength/quality measurements in block/bit error rate, cell congestion/load status, and so forth. A registration request can be included in an RRC connection request, could be carried out on RRC level, e.g. as a new RRC connection setup cause, negotiated over NAS signalling, etc. As mentioned above, the response to the request may be given by the network node in an RRC connection setup message. Similarly, an RRC connection re-establishment request may include the registration request and the response to the request may be included in an RRC connection reconfiguration message.

The network node may choose to de-register one or more wireless devices and send a de-registration message to these wireless devices which will then be removed from the set. The updated registered set will then determine which wireless devices are allowed for contention-based access and these devices will be considered as hypotheses in the operation of decoding contention-based transmissions on the radio resource.

In some possible embodiments, the registration information may comprise various preferences, e.g. relating to MCS, traffic patterns, coverage enhancement level, protocol preferences, etc. Some possible preferences are mentioned below.

Protocol Preferences for Contention-Based Access:
HARQ
RLC AM/UM
Header compression
Timing Advance preference
Power control parameters preference
Preferences for Uplink Channels for Contention-Based Access:
PUCCH, e.g. related to SR, CQI or ACK/NACK
PUSCH
Preferences for Downlink Channels for Contention-Based Access:
PDCCH, e.g. related to Pw Contrl Cmd, Harq info
PHICH, e.g. related to ACK/NACK procedures
PCFICH, e.g. related to PDCCH info In yet another embodiment, there could be different groups of radio resources reserved for contention-based transmissions of data, e.g. for different coverage enhancement levels or any other differences in settings. In that case, the wireless devices may perform registration for any these groups individually.

While the solution has been described with reference to specific exemplifying embodiments, the description is generally only intended to illustrate the inventive concept and should not be taken as limiting the scope of the solution. For example, the terms "network node", "wireless device", "contention based uplink transmissions", "radio resource" and "blind decoding" have been used throughout this disclosure, although any other corresponding entities, functions, and/or parameters could also be used having the features and characteristics described here. The solution is defined by the appended claims.

What is claimed is:

1. A method performed by a wireless device, served by a network node of a radio network, for enabling the network node to decode contention based uplink transmissions of data, the method comprising:
    initiating automatic registration of the wireless device with the network node, for contention based uplink transmissions of data on a radio resource reserved for contention based uplink transmissions of data;
    receiving an acknowledgement from the network node indicating that the wireless device is registered for contention based uplink transmissions of data, wherein the acknowledgement comprises an identifier; and
    transmitting, using the identifier, data on the radio resource, thereby enabling the network node to perform blind decoding of the data by considering wireless devices being registered for contention based uplink transmissions of data on the radio resource.

2. The method according to claim 1, wherein the wireless device refrains from transmitting data on the radio resource in case a de-registration message is received from the network node indicating that the wireless device is de-registered.

3. The method according to claim 1, wherein the wireless device sends a de-registration request to the network node when deciding not to transmit any further data.

4. The method according to claim 1, wherein the wireless device initiates the automatic registration based on preferences or settings.

5. A wireless device configured, to enable a serving network node of a radio network to decode contention based uplink transmissions of data, the wireless device comprising:
- a communication circuit; and
- a processor configured to:
  - initiate, via the communication circuit, automatic registration of the wireless device with the network node, for contention based uplink transmissions of data on a radio resource reserved for contention based uplink transmissions of data;
  - receive, via the communication circuit, an acknowledgement from the network node indicating that the wireless device is registered for contention based uplink transmissions of data, wherein the acknowledgement comprises an identifier; and
  - transmit, via the communication circuit, data, using the identifier, on the radio resource, thereby enabling the network node to perform blind decoding of the data by considering wireless devices being registered for contention based uplink transmissions of data on the radio resource.

6. The wireless device according to claim 5, wherein the processor is configured to refrain from transmitting data on the radio resource in case a de-registration message is received from the network node indicating that the wireless device is de-registered.

7. The wireless device according to claim 5, wherein the processor is configured to send, via the communication circuit, a de-registration request to the network node, responsive to the processor deciding not to transmit any further data.

8. The wireless device according to claim 5, wherein the processor is configured to initiate the automatic registration based on preferences or settings.

9. A method, performed by a network node of a radio network, for decoding of contention based uplink transmissions of data, the method comprising:
- registering a wireless device for contention based uplink transmissions of data on a radio resource reserved for contention based uplink transmissions of data;
- sending an acknowledgement to the wireless device indicating that the wireless device is registered for contention based uplink transmissions of data on the radio resource, wherein the acknowledgement comprises an identifier; and
- performing blind decoding of contention based uplink transmissions on the radio resource by considering the identifier and wireless devices being registered for contention based uplink transmissions of data on the radio resource.

10. The method of claim 9, further comprising:
- sending a de-registration message indicating to the wireless device to refrain from transmitting data using the radio resource.

11. A network node configured for decoding of contention based uplink transmissions of data in a radio network, the network node comprising:
- a communication circuit; and
- a processor configured to:
  - register a wireless device for contention based uplink transmissions of data on a radio resource reserved for contention based uplink transmissions of data;
  - send, via the communication circuit, an acknowledgement to the wireless device, indicating that the wireless device is registered for contention based uplink transmissions of data on the radio resource, wherein the acknowledgement comprises an identifier; and
  - perform blind decoding of contention based uplink transmissions received via the communication circuit on the radio resource, by considering the identifier and wireless devices being registered for contention based uplink transmissions of data on the radio resource.

12. The network node of claim 11, wherein the processor is further configured to:
- send, via the communication circuit, a de-registration message indicating to the wireless device to refrain from transmitting data using the radio resource.

13. The network node of claim 11, wherein the wireless device is one among multiple wireless devices registered for contention based uplink transmissions of data on the radio resource, with each one among the multiple wireless devices being associated with a respective identifier, and wherein the processor is configured to perform blind decoding of any given contention based uplink transmission received on the radio resource by performing one or more decoding attempts, where each decoding attempt uses a different one among the respective identifiers and correct decoding at the network node depends on using the respective identifier of the wireless device that originated the given contention based uplink transmission.

* * * * *

UNITED STATES PATENT AND TRADEMARK OFFICE
CERTIFICATE OF CORRECTION

PATENT NO. : 11,723,065 B2
APPLICATION NO. : 17/386112
DATED : August 8, 2023
INVENTOR(S) : Höglund et al.

It is certified that error appears in the above-identified patent and that said Letters Patent is hereby corrected as shown below:

In the Specification

In Column 1, Line 37, delete "NB" and insert -- NB, --, therefor.

In Column 3, Line 17, delete "node," and insert -- node. --, therefor.

In Column 3, Line 34, delete "the work node" and insert -- the network node --, therefor.

In Column 9, Line 50, delete "node," and insert -- node --, therefor.

In Column 12, Line 41, delete "processor may" and insert -- processor P may --, therefor.

In Column 13, Line 47, delete "in block/bit" and insert -- in uplink, block/bit --, therefor.

In Column 14, Line 12, delete "CQI or" and insert -- CQI, or --, therefor.

In Column 14, Line 31, delete ""radio resource"" and insert -- "radio resource", --, therefor.

In the Claims

In Column 15, Line 1, in Claim 5, delete "configured," and insert -- configured --, therefor.

Signed and Sealed this
Sixteenth Day of January, 2024

Katherine Kelly Vidal
*Director of the United States Patent and Trademark Office*